Patented Mar. 16, 1954

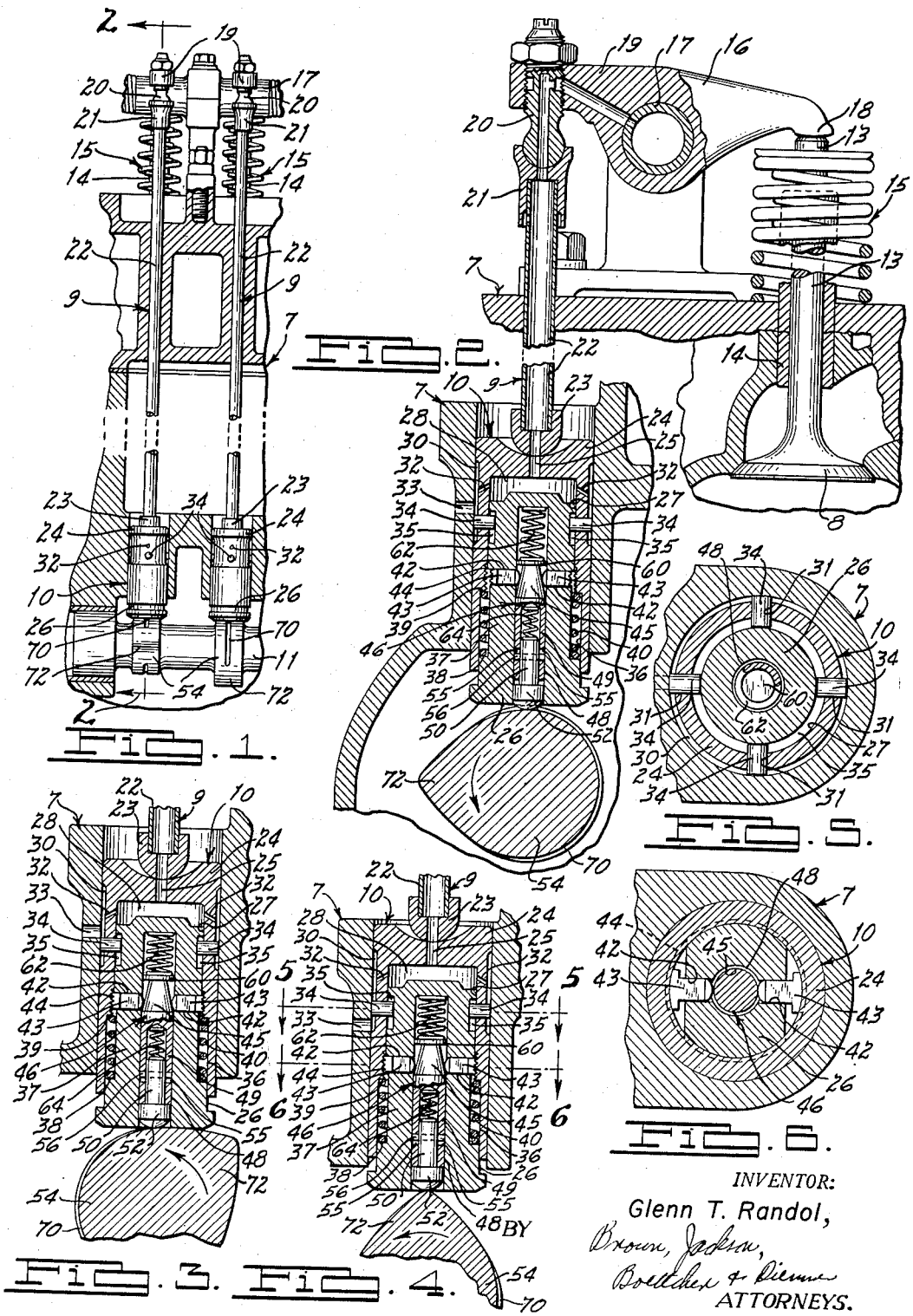

2,672,132

UNITED STATES PATENT OFFICE 2,672,132

MECHANICAL SELF-ADJUSTING VALVE LIFTER

Glenn T. Randol, Mountain Lake Park, Md., assignor of one-half to Elizabeth Leighton Randol, Mountain Lake Park, Md.

Application November 29, 1950, Serial No. 198,215

14 Claims. (Cl. 123—90)

My invention relates to an improvement in a mechanical self-adjusting valve lifter which is adapted to maintain zero clearance in the valve drive train of an engine in which it is embodied.

Valve lifters are well known and, so far as I am aware, present day commercial devices provide for maintaining substantially zero clearance by means of a hydraulic unit, controlled by a valve to trap oil in the hydraulic unit, so that it, in effect, functions as a solid body member in opening the valve of an engine. However, a major deficiency of the known hydraulic valve lifters is that they do not function uniformly under all operating conditions of the engine with consequent varying degrees of backlash in the valve operating gear causing irregular valve operation and attendant reduction in the efficiency of the engine.

It is an object of my invention to provide a valve lifter mechanism of a character operable to maintain automatically substantially zero clearance in the valve drive train, in which it is embodied, under substantially all engine operating conditions.

In a preferred embodiment of my invention, I propose to provide a valve lifter mechanism adapted to be arranged in the valve drive train between an engine valve and cam shaft comprising an outer body member or element mounted for sliding movement in the block of an engine, an inner body member or element mounted for sliding movement in and relative to the outer body member, and clutch means between the inner and outer body members effective, upon engagement thereof, to establish zero clearance in the valve drive train in opening of the engine valve.

A further object of my invention is to provide relatively movable inner and outer body members or elements and a clutch therebetween, as above mentioned, and in which the lifter mechanism includes means adapted, upon disengagement of the clutch, for making incremental adjustments between the movable elements or members to compensate for any backlash in or over-adjustment of the valve train and establish zero clearance therein upon closing of the engine valve.

The object last noted is achieved in the preferred embodiment of my invention, herein disclosed, by providing spring means between the inner and outer body members or elements, which spring means functions to bias normally the inner and outer body members away from each other and to disengage the clutch means, and is capable of accommodating movement of the body members toward each other to maintain substantially zero clearance in the valve drive train until just immediately prior to re-engagement of the clutch in the next succeeding valve opening operation.

A further object of my invention resides in providing an arrangement of parts, as above related, in which the inner body member carries plunger means comprising two elements telescopically disposed and interconnected for limited relative movement against the bias of an interposed pre-energized force-transmitting spring, and in which the cam of the cam shaft of the engine is suitably formed for cooperation with one of the plunger elements to cause the other element to effect engagement of the clutch means between the inner and outer body members or elements immeditely prior to lifting of the clutched body members, as a unit, to open the engine valve.

A preferred feature of my invention resides in providing a hollow outer body member in which the inner body member is mounted for rectilinear sliding and rotational movement, and in which the clutch means therebetween comprises a plurality of clutch elements or shoes mounted in the inner body member for radial movement, i. e. transverse to the direction of sliding movement of the inner and outer body members, and in which the outer ends of the clutch elements or shoes are formed with positive clutch elements for engagement with positive clutch elements formed in the outer body member.

A further preferred feature resides in providing a structure, as last aforesaid, in which the plunger means, carried by the inner body member, has the inner end thereof tapered or formed as a portion of a surface of a cone, and in which the inner ends of the clutch shoes are rounded or of semispherical configuration, whereby the inner end of the plunger means, upon movement thereof inwardly of the inner body member, effects the radial outward movement of the shoes to engage the clutch means.

The above and other objects, advantages, and features of my invention will appear from the detailed description.

Now, in order to acquaint those skilled in the art with the manner of making and using valve lifter mechanisms in accordance with the principles of my present invention, I shall describe, in connection with the accompanying drawings, a preferred embodiment of my invention.

In the drawings:

Figure 1 is a fragmentary vertical sectional view, through an internal-combustion engine, showing in elevation a valve lifter mechanism constructed in accordance with the principles of my present invention;

Figure 2 is an enlarged vertical sectional view taken substantially along the line 2—2 of Figure 1, looking in the direction indicated by the arrows, and showing my valve lifter mechanism in engine valve closed position;

Figure 3 is a detail vertical sectional view of the valve lifter mechanism of Figures 1 and 2, with the parts thereof in locked-up zero clearance condition just prior to opening of the engine valve;

Figure 4 is another detail vertical sectional view of the valve lifter mechanism of Figures 1 and 2, but showing the parts thereof in engine valve open position;

Figure 5 is a transverse sectional view taken substantially along the line 5—5 of Figure 4, looking in the direction indicated by the arrows, and illustrating the manner in which radial limiting pins are incorporated in the structure to prevent displacement of the inner and outer body parts of the valve lifter mechanism when the latter is disassembled from the engine of the vehicle; and Figure 6 is a transverse sectional view taken substantially along the line 6—6 of Figure 4, looking in the direction indicated by the arrows, and showing in detail the movable clutch shoes or elements of the clutch means for clutching the inner and outer body parts of the mechanism together, after establishment of zero clearance and prior to the valve being opened by rotation of the engine cam shaft.

Referring now to the drawings, I have shown a preferred embodiment of my invention embodied with a conventional internal-combustion engine 7 having a plurality of valves, one of which is shown at 8 in Figure 2. A valve drive train 9 is provided, as is well understood in the art, for each valve of the engine, and the valve drive train is conventional in all respects, except for the valve lifter mechanism 10 of my invention which is embodied therein. The valve drive train 9, as shown, extends between the valve 8 and the cam shaft 11 of the engine. The valve 8 may be of any known construction, and the valve selected for illustration includes a stem portion 13, guided in a collar part 14, and having spring means 15 associated therewith for normally tending to close the valve. A rocker arm 16, pivotally mounted intermediate its ends on an oil distributing pipe 17, is adapted to bear at one end 18 thereof against the free end of stem 13 when rotated in a clockwise direction, as viewed in the drawings, to open valve 8 against the force of the spring means 15. The other end 19 of the rocker arm 16 has a fitting 20 secured therein, and with which is associated a connector member 21 having one end of a hollow push rod 22 secured thereto, which bears against the dished upper end portion of a hollow outer body member 24 which is mounted for vertical sliding movement in a bore provided therefor in the engine block. The hollow outer body member 24, as will presently appear, forms a part of the lifter mechanism 10 of my invention. The end portion 19 of the rocker arm 16, fitting 20, and connector 21 are provided with suitable bores to conduct oil under pressure from the pipe 17 of the lubricating system of the engine to the hollow push rod 22, and from the latter through bores in the part 23 and bore 25 at the upper end of the outer body part 24 of the lifter mechanism.

The lifter mechanism 10 further comprises an inner body part 26 which, as shown in Figure 2, is mounted for rectilinear sliding and rotational movement in bore 27, opening into the outer body part 24 from the lower end thereof. The inner end of the inner body part 26, together with the upper end portion of outer body part 24, form or define an oil chamber 28 which receives oil under pressure from the lubricating system of the engine through the oil pipe 17 and the several parts, as already described. The upper portion of the outer periphery of the outer body part 24 is provided with an annular channel 30, which connects chamber 28 by means of the bleed passages 32 in body part 24 with oil discharge passage 33 in the engine block, whereby oil under pressure, delivered from pipe 17 to oil chamber 28, is returned to the oil reservoir of the engine.

The outer body part 24, as best shown in Figures 2 and 5, is provided with a plurality of radially extending and circumferentially spaced openings 31 in which pins 34 are supported. The inner ends of the pins 34 are adapted to project into an axially extending annular groove 35 formed in the upper external portion of the inner body part 26. The pins 34 and groove 35 provide for retaining the inner and outer body parts in assembled relation when the valve lifter mechanism 10 is removed from the block of the engine, and also accommodate relative rotational movement therebetween. It will be observed, in the description of operation of the valve lifter mechanism of my invention following hereinafter, that the axial extent of the groove 35 of the inner body part is such that the ends of the groove do not contact the radial pins 34 in the operative positions of the body parts with respect to each other. The pins 34 are merely provided to prevent separation of the two body parts when the unit is removed from the engine.

The outer body part 24 adjacent its lower end is counterbored, as indicated at 36, and the inner body part 26 is formed with a reduced cylindrical portion 37 defining a shoulder 38 which, together with the shoulder 39 at the inner end of the counterbore 36 of the outer body part 24, provide end seats for a coil spring 40, arranged between the body parts to normally bias them away from each other. As will be apparent, the spring 40 will also accommodate movement of the body parts toward each other.

It will be observed that the inner body part 26, as best shown in Figures 2 and 6, is provided, intermediate its ends, with transversely extending and diametrically opposed openings 42, each of which receives a clutch shoe 43 in a manner to provide for the radial inward and outward movement of the clutch shoes. The clutch shoes at their outer ends are preferably provided with positive clutch teeth comprising horizontally extending and parallel V-shaped serrations, which, for example, may measure about .002 inch between adjacent apexes. In order to provide for positive clutching engagement of the clutch shoes 43, I further propose to provide the periphery of the inner surface, at the lower end of bore 27, with a plurality of serrations 44 comparable to the serrations at the outer ends of the clutch shoes 43, so that when the clutch shoes 43 are engaged therewith, the inner and outer body parts are positively clutched together for conjoint movement, for a purpose to be hereinafter described. The inner ends of the clutch shoes 43 are preferably semispherical in configuration and are adapted to have contacting engagement with the tapered end 45 of a plunger means, indicated generally at 46, slidably mounted in the inner body part 26 for movement coaxially of bore 27. For this purpose, the inner body part 26 is preferably provided with an axially extending bore 48, extending inwardly from the lower end of the inner body part 26. The plunger means 46 comprises an outer plunger part 49 having the aforementioned tapered inner end portion 45 and an inner or telescopic plunger part 50 having a follower head portion 52 at the lower end thereof for engaging with a cam 54 of the cam shaft 11 of the engine. The outer plunger part 49 adjacent the lower end thereof is provided with a pair of opposed slots 55 and the inner end portion of the inner plunger part 50 carries a cross pin 56, the ends of which are disposed in the opposed slots 55, with said pin and slots providing for retaining the plunger parts in assembled relation. A washer 60 is disposed at the upper end of the tapered portion 45 of the outer plunger part and a coil spring 62 is disposed between the washer 60 and the inner end of the bore 48 in the inner body part 26. This spring normally tends to bias the plunger means 46 in a direction outwardly of the lower end of the valve lifter mechanism 10. A second coil spring 64 is disposed between the inner end of the inner plunger part 50 and the end of the bore in the outer plunger part for normally biasing the inner plunger part 50 away from the outer plunger part 49 to engage the ends of pin 56 with the lower ends of slots 55. The spring 64 is of greater strength than the spring 62, and the purpose of this relationship will appear in the following description of the operation of my present valve lifter mechanism.

Referring now to the cam 54, it will be observed that it is formed with a groove 70 which lies, for its major extent, on the base circle of the cam and at its opposite end merges into a projecting portion 72 which provides for opening of the engine valve. Preferably, the groove terminates just prior to the effective valve lifting action of the projection 72, and measured in degrees, this grove may terminate five degrees prior to the effective lifting action of the projection 72.

As previously indicated, the tapered end 45 of the outer plunger part 49 constitutes a portion of a surface of a cone, and this taper may, for example, be of the order of ten or fifteen degrees to the perpendicular to avoid any wedging effect between the tapered end and the rounded spherical inner ends of the clutch shoes 43 in order to prevent jamming of the mechanism in operation.

I shall now describe the manner in which the valve lifter mechanism 10 of my invention operates, and for this purpose reference may first be had to Figure 2 in which the engine valve is shown in closed position. In this position of the valve, the inner plunger part 50 has the follower end 52 thereof disposed in the groove 70 of the cam 54, and the plunger means 46 is disposed to its inoperative or nonclutching engaging position in which the clutch shoes 43 are disposed radially inwardly of the inner body part 26, whereby the clutch means between the inner and outer body parts is disengaged. The coil spring 40, between the inner and outer body parts 26 and 24, respectively, disposes these parts relative to each other so that the lower end of the inner body part 26 rides on the base circle portion of the cam 54. The spring 40 tends to bias the body members away from each other to take up clearance in the valve drive train, but will, if required, accommodate relative movement of the body members toward each other to compensate for expansion or over-adjustment of the train. The spring 40 is thus effective to maintain zero clearance in the valve train between the cam shaft and the engine valve. The cam shaft 11, rotating in a counterclockwise direction, as indicated by the arrow in the drawing, advances to the position shown in Figure 3, and in which position the follower 52 has emerged from the end or merging portion of the groove 70 into the lift cam portion 72 of the cam 54, effecting inward movement of the inner plunger part 50 which, through the force-transmitting spring 64, has effected upward movement of the outer plunger part 49 to engage the tapered end 45 thereof with the semispherical inner ends of the clutch shoe members 43, biasing the clutch shoe members 43 radially outwardly and engaging the positive clutch teeth at the outer ends thereof with the adjacent clutch teeth of the outer body part so that the inner and outer body parts are clutched together for conjoint movement. Thus, upon continued rotation of the cam shaft, the valve lifting cam portion 72 thereof, in its movement from the position shown in Figure 3 to the position shown in Figure 4, raises the inner and outer body parts as a unit, which effects, through push rod 22 and rocker arm 16, movement of the valve 8 to open position. It will thus be observed that just prior to the valve lifting action of the projection 72 of cam 54, that the inner and outer body parts are clutched together so that in the valve opening operation substantially zero clearance is maintained in the valve train. The pin 56, carried by the inner plunger part 50, and the slots 55, in the outer plunger part, are suitably proportioned so that in a valve closing operation the enlarged follower head portion 52 engages the lower end of the outer body part before the ends of pin 56 reach the upper ends of slots 55 so that in a valve operation no force is transmitted through the pin to the outer plunger part 49. Upon further continued counterclockwise rotation of the cam 54, from the position of Figure 4 to the position of Figure 2, the parts will again assume the position shown in the latter figure, with the spring 40, in the position of the parts of Figure 2, providing for maintaining substantially zero clearance in the valve train in the closed position of the engine valve as pointed out hereinbefore. In the position of the parts shown in Figure 2, the spring 62 serves to move the plunger means 46 downwardly, thus withdrawing the tapered end 45 from the inner ends of the clutch shoes, whereby the clutch shoes are freed for radial inward movement to disengage the clutch between the inner and outer body parts 26 and 24, respectively. The clutch shoes 43 are moved radially inward upon the occurence of relative movement between the body parts under the influence of either the spring 40 or the force exerted on the outer body member from the valve drive train, depending upon the compensation to be made by the valve lifter mechanism. Accordingly, at this condition of operation, the body parts are free to move relative to one another in either direction for making any necessary incremental adjustments between the body parts to compensate for any backlash, over-adjustment, or expansion in the valve drive train assembly which may exist and thus establish zero clearance.

The oil under pressure, in previously referred to oil chamber 20, serves to quiet and cushion the lifter operation, providing smooth and silent engine operation.

It will be understood that the clutch elements at the outer ends of the clutch shoes 43 and the cooperating clutch teeth in the outer body part may, as will be readily recognized by persons skilled in the art, be of many other forms, such, for example, as vertically extending V-shaped serrations which may or may not be tapered, as desired, to provide either frictional engagement or additionally a wedging action in the clutching operation.

In installing the valve lifter mechanism of the present invention in the valve drive train of an engine, it makes no difference whether the engine be hot or cold during installation since overadjustment, which would normally occur if the engine were hot during installation, and underadjustment, which would normally occur if the engine were cold during installation, are readily compensated for and eliminated by the automatic operation of the valve lifter of the present invention.

While I have shown what I consider to be a preferred embodiment of my invention, it will be understood that various modifications and rearrangements may be made therein without departing from the spirit and scope of my invention.

I claim as my invention:

1. A valve lifter mechanism comprising a hollow outer body member, an inner body member mounted for sliding movement in said outer body member, clutch means mounted in said inner body member for movement transverse to the direction of sliding movement of said inner body member relative to said outer body member for engagement with the latter, whereby said body members are adapted to be clutched to each other.

2. A valve lifter mechanism comprising an outer body member having a bore therein, an inner body member mounted for axial sliding movement in the bore of said outer body member, a plurality of clutch members mounted for sliding movement in said inner body radially inwardly and outwardly of the axis of said bore, said clutch members having positive clutch elements at the outer ends thereof, and said outer body member having positive clutch elements adapted to be engaged by the clutch elements at the outer ends of said clutch members to clutch said outer and inner body members together.

3. A valve lifter mechanism comprising an outer body member having a bore extending inwardly of one end thereof, an inner body member extending into the bore of said outer body member for sliding movement relative thereto, clutch shoe means mounted in said inner body member for movement radially of the axis of said bore, plunger means in said inner body member for movement in a direction lengthwise of said bore and adapted upon movement in a direction inwardly thereof for engaging said clutch shoe means to force the same into engagement with said outer body member for clutching said body members together, and spring means mounted between said outer and inner body members adapted upon release of said plunger means to accommodate relative movement of said body members, said clutch shoe means being disengaged from said outer body member upon occurrence of relative movement between said body members.

4. A valve lifter mechanism comprising an outer body member having a bore extending inwardly of one end thereof, an inner body member extending into the bore of said outer body member for sliding movement relative thereto, clutch shoe members mounted for sliding movement in said inner body member in a direction radially inwardly and outwardly of the axis of said bore to positions in which the outer ends of said shoe members may be engaged with or disengaged from said outer body member, plunger means mounted in said inner body member for movement in a direction lengthwise of said bore and having a tapered portion at its inner end adapted upon movement of said plunger means inwardly of said body member for engaging the inner ends of said clutch shoe members to bias the latter radially outwardly into clutching engagement with said outer body member, spring means normally biasing said plunger means in a direction outwardly of said inner body member to dispose the tapered portion thereof to a position in which said clutch shoe members may move radially inwardly to their disengaged position, and spring means between said outer body member and said inner body member normally biasing them away from each other and accommodating movement of the same toward each other in the normal position of said plunger means, said clutch shoe members being disengaged from said outer body member upon the occurrence of relative movement between said body members.

5. A valve lifter mechanism comprising an outer body member having a bore extending inwardly of one end thereof, an inner body member extending into the bore of said outer body member for sliding movement relative thereto and with there being a fluid chamber formed between the other end of said outer body member and the inner end of said inner body member, clutch shoe members mounted for sliding movement in said inner body member for movement in a direction radially inwardly and outwardly of the axis of said bore to positions in which the outer ends of said shoe members may be engaged with or disengaged from said outer body member, said inner body member having a bore extending inwardly of its outer end coaxially of the bore of said outer body member, plunger means mounted for movement axially in the bore of said inner body member and comprising outer and inner plunger parts, spring means between said inner and outer plunger parts for normally biasing them away from each other, second spring means of less strength than said first spring means disposed between the inner end of said outer plunger part and the inner end of the bore of said inner body member, clutch shoe members mounted in said inner body member for sliding movement in a direction radially inwardly and outwardly of the axes of said bores to positions in which the outer ends of said shoe members may be engaged with or disengaged from said outer body member, said outer ends of said shoe members having clutch elements thereat and said outer body member having a portion of the inner surface thereof formed with positive clutch elements adapted to be engaged by the clutch elements at the outer ends of said clutch shoe members, said inner end of said outer plunger part being tapered and adapted upon movement thereof inwardly of the bore of said inner body member for engaging the inner ends of said clutch shoe members to bias the latter radially outwardly into clutching engagement with said outer body member, and spring means between said outer body member and said inner body member normally biasing them away from each other and accommodating relative movement of said body members toward one another, said second spring means in the normal position of said plunger means effecting disengagement of said inner end of said outer plunger part and said clutch shoe members to accommodate disengagement of said clutch shoe members from said outer body member.

6. The valve lifter mechanism of claim 5 characterized by the provision of pin and slot means between the inner and outer body members for limiting movement of the parts away from each other by the spring means disposed therebetween.

7. The valve lifter mechanism of claim 5 characterized by the provision of pin and slot means between the inner and outer plunger parts for limiting movement of the parts away from each other under the influence of said first named spring means.

8. The valve lifter mechanism of claim 5 characterized by the provision of first pin and slot means between the outer and inner body members for limiting movement thereof away from each other by means of the spring means disposed therebetween, and by the provision of second pin and slot means between the outer and inner plunger parts for limiting the movement of said parts away from each other under the influence of said first named spring means.

9. A valve lifter mechanism for use in a valve drive train for a valve of an engine, comprising body means including a pair of body parts movable relative to each other to maintain substantially zero clearance in the valve drive train, clutch means operably incorporated between said body parts for clutching them together, rotatable cam means, and plunger means actuatably disposed between said cam means and said clutch means, said cam means including a base circle portion and a lobe portion, the base circle portion of said cam means presenting a pair of non-concentric surfaces merging into a common surface at said lobe portion, one of said non-concentric surfaces engaging said plunger means and the other engaging said body means, said plunger means being actuated by said cam means immediately prior to engagement of said lobe portion of said cam means with said body means to effect engagement of said clutch means, said plunger means and said cam means being so constructed and arranged as to relax said clutch means to accommodate relative movement of said body parts except upon actuation of said body means by the lobe portion of said cam means.

10. A valve lifter mechanism for use in a valve drive train for opening and closing the valve of an engine comprising body means comprising a pair of body parts movable relative to each other and adapted to be disposed in said valve drive train, spring means between said body parts normally biasing them away from each other and accommodating relative movement of said body members toward one another to maintain substantially zero clearance in the valve drive train in the closed position of the engine valve, cam means for engaging said body means to open said valve, clutch means between said body parts for clutching them together for conjoint movement in opening of said engine valve, and plunger means between said cam means and said clutch means for effecting engagement of the latter to maintain substantially zero clearance in said valve train, said cam means including a body portion and a lobe portion and having a groove in the body portion thereof for the reception of said plunger means, said groove merging with said lobe portion to effect actuation of said plunger means and engagement of said clutch means immediately prior to engagement of said cam means with said body means to open said valve.

11. A valve lifter mechanism for use in a valve drive train for opening and closing the valve of an engine, comprising body means including relatively movable body parts, spring means between said body parts normally biasing them away from each other and accommodating relative movement of said body parts toward one another to maintain substantially zero clearance in the valve drive train in the closed position of the engine valve, clutch means operably incorporated between said body parts, said clutch means being movable transversely of the direction of movement of said body parts to clutch the same together for conjoint movement and to accommodate release of the same for relative movement, engine-driven rotatable cam means having at least two concentrically disposed circular portions of different diameters, a lobe portion common to both of said circular portions, and a camming ramp defined by predetermined angular mergence of one of said circular portions with the beginning substantially of said lobe portion, said other circular portion being adapted to rotationally engage said body means, and reciprocative plunger means carried by one of said body parts between said clutch means and said one circular portion for actuation by said camming ramp to accommodate release and effect engagement of said clutch means, said plunger means including two interconnected telescopic elements normally spring-pressed apart and adapted for limited relative movement toward each other in opposition to said spring when actuated by said camming ramp whereby release of said clutch means is effective substantially during rotational engagement of said circular portions with said body means and said plunger means, to enable relative movement of said body parts, as aforesaid and the engagement of said clutch means being effected during rotation of said camming ramp into operative engagement with said plunger means immediately prior to operative engagement of said lobe portion with said body means, to clutch said body parts together for conjoint movement to open and close the engine valve.

12. A valve lifter mechanism for use in a valve drive train for opening and closing the valve of an engine comprising, body means including body parts movable relative to each other to an extent for maintaining substantially zero clearance in the valve drive train in the opened and closed positions of said valve, spring means between said body parts normally biasing them away from each other and accommodating relative movement between said body members toward one another in the closed position of said engine valve to maintain substantially zero clearance in the valve drive train, clutch means for clutching said body parts together for conjoint movement, a rotatable cam having a base circle portion and a valve opening portion projecting outwardly of said base circle portion, a groove extending inwardly into said base circle portion and merging at its ends into said valve opening portion, and plunger means between said clutch means and said cam including a follower member adapted to ride in said groove and operable prior to entering upon said valve opening portion for engaging said clutch means, whereby said body parts are adapted to be clutched together immediately prior to the engagement thereof by said valve opening portion of said cam to open said engine valve and thereby maintain substantially zero clearance of said valve drive train in the opening of said engine valve.

13. A valve lifter mechanism for use in a valve drive train for opening and closing the valve of an engine comprising a pair of relatively movable body members, spring means between said body members normally biasing the same away from each other and accommodating relative movement of the same toward each other to maintain substantially zero clearance in the valve drive train, the engine including a cam for moving one of said body members in the direction to open the engine valve, and means adapted for positive actuation in response to the engine cam for coupling said body members together for conjoint movement during movement of said one body member by the cam, said means being relaxed during the major portion of movement of the engine cam to accommodate movement of said body members with respect to one another according to the adjustment required in the valve drive train, said means including a plunger movable inwardly of said body members to effect coupling of the same, the cam including a base circle portion and a valve opening portion and having a groove in the base circle portion thereof, the groove merging with the valve opening portion to effect actuation of said plunger and coupling of said body members immediately prior to actuation of said one body member and to effect engagement between said one body member and the full width of the cam.

14. A valve lifter mechanism for use in a valve drive train for opening and closing the valve of an engine comprising a pair of relatively movable body members, spring means between said body members normally biasing the same away from each other and accommodating relative movement of the same toward each other to maintain substantially zero clearance in the valve drive train, the engine including a cam for moving one of said body members in a direction to open the engine valve, a plunger guided for sliding movement by one of said body members and having a portion extending exteriorly of said body members for engagement with said cam, said cam having a lobe adapted to effect movement of the body member engaged thereby, said cam having a groove therein in the portion thereof outside the area of said lobe adapted for the reception of said plunger, and means adapted to be actuated by said plunger for coupling said body members together for conjoint movement, said plunger when received in said groove relaxing said means to accommodate relative movement of said body members according to the adjustment required in the valve drive train, said plunger being actuated by said cam as said groove merges with said lobe to actuate said means whereby said body members are conjointly actuated by said lobe to open the engine valve, said means being relaxed upon entry of said plunger into said groove after actuation of said body members to accommodate adjustment of the valve drive train.

GLENN T. RANDOL.

References Cited in the file of this patent

UNITED STATES PATENTS

| Number | Name | Date |
| --- | --- | --- |
| 1,663,345 | Lievre | Mar. 20, 1928 |
| 1,806,231 | Williams | May 19, 1931 |
| 1,930,261 | Berry | Oct. 10, 1933 |